United States Patent
Girardeau, Jr. et al.

(10) Patent No.: US 6,535,565 B1
(45) Date of Patent: Mar. 18, 2003

(54) RECEIVER RATE CONVERTER PHASE CALCULATION APPARATUS AND METHOD

(75) Inventors: James Ward Girardeau, Jr., Sacramento, CA (US); Calvin Kasadate, Folsom, CA (US); Kurt E. Sundstrom, Carmichael, CA (US)

(73) Assignee: Level One Communications, Inc., Sacramento, CA (US)

( * ) Notice: Subject to any disclaimer, the term of this patent is extended or adjusted under 35 U.S.C. 154(b) by 0 days.

(21) Appl. No.: 09/268,474

(22) Filed: Mar. 16, 1999

(51) Int. Cl.[7] .................................................. H04L 7/00
(52) U.S. Cl. ...................... 375/357; 375/371; 327/144; 713/600; 713/400
(58) Field of Search ................................ 375/371, 373, 375/375, 376, 356, 357, 354, 362; 713/503, 400, 500, 600; 327/141, 144

(56) References Cited

U.S. PATENT DOCUMENTS

| 5,448,715 A | * | 9/1995 | Lelm et al. ................. 713/600 |
| 5,513,209 A |   | 4/1996 | Holm |
| 5,991,844 A | * | 11/1999 | Khosrowpour ............... 710/129 |
| 6,049,887 A | * | 4/2000 | Khandekar et al. ......... 713/503 |
| 6,359,479 B1 | * | 3/2002 | Oprescu ..................... 327/141 |
| 6,393,502 B1 | * | 5/2002 | Meyer et al. ................. 710/58 |

* cited by examiner

Primary Examiner—Chi Pham
Assistant Examiner—Phuong Phu
(74) Attorney, Agent, or Firm—Merchant & Gould P.C.

(57) ABSTRACT

A communication system includes a timing circuit which generates phase conversion information from a transmitter to transfer data from a first clock domain to a second clock domain, and a receive phase calculation circuit which utilizes the phase information from the transmitter to transfer data from the second clock domain to the first clock domain. The timing circuit includes a transmit (TX) numerical controlled oscillator (NCO) and a modulo indicator, and the receive phase calculation circuit calculates a receive phase based on a modulo signal.

17 Claims, 6 Drawing Sheets

RECEIVER RATE CONVERTER PHASE CALCULATION APPARATUS AND METHOD

BACKGROUND OF THE INVENTION

1. Field of the Invention

This invention relates in general to the field of digital signal processing in digital communication. More particularly, the invention relates to a reciprocal phase calculation apparatus and method thereof in a digital communication system.

2. Description of Related Art

The telephone networks currently in place were originally designed for transmission of electrical signals carrying human speech. Since human speech is generally confined within a band ranging from 0 Hertz to 3,400 Hertz, telephone networks were designed to provide telephone lines to each user which were capable of handling frequencies within this range. Today, these same telephone lines, which connect a service user to a central office, are in place, permitting communication of only voice data or analog modem transmissions of not more than 56,000 bits per second. However, connections between central offices of telephone networks are provided by high-bandwidth fiber optic transmission facilities in nearly every telephone network worldwide.

Because the local telephone lines which connect an end user to a central office are only capable of handling frequencies of up to 3,400 Hertz, communication equipment utilizing these lines, such as dial modems or fax modems, have been accordingly limited in bandwidth. Despite the presence of high bandwidth fiber optic lines between central offices, users remain limited in the bandwidth available to them because the local lines serve as a bottleneck. New technologies, such as the Internet or video conferencing, demand that the bottleneck be removed.

Digital Subscriber Line (DSL) technologies are capable of removing the bottleneck. DSL pennits a user to communicate over the existing telephone lines at a rate of tens of millions of bits per second. In order to utilize DSL, a site must be equipped with a transceiver (a DSL modem) which communicates, via the existing telephone lines, with another transceiver located at the central office of the network access provider, generally the local telephone company.

Generally, the DSL communication systems are symmetric modems typically include symmetric transmit and receive paths. An example of such a system is shown in FIG. 1, where a sample rate conversion is employed to transfer data from a conversion clock CLK2 of the analog-to-digital (A/D) and the digital-to-analog (D/A) converters to a system clock CLK1 of the digital signal processing (DSP) core. In the transmit (TX) path of such a symmetric communication system, data is sent from the DSP core, which operates on the first clock domain (CLK1), to a frequency conversion system which operates on the second clock domain (CLK2). Likewise, in the receive (RX) path, data from the frequency conversion system which operates on the second clock domain (CLK2) is passed to the DSP core which operates on the first clock domain (CLK1). The sample rate conversion in the transmit (TX) path can be accomplished through the use of a numerically controlled oscillator (NCO) with a phase word $W_{TX}=f_1/f_2$, wherein $f_1$ represents the frequency of CLK1, and $f_2$ represents the frequency of CLK2. Similarly, the sample rate conversion in the receive (RX) path can be accomplished through the use of an NCO with a reciprocal phase word $W_{RX}=f_2/f_1=1/W_{TX}$.

However, the problem of using a reciprocal phase word is that finite precision effects within the implementation of the system can cause $W_{TX} \neq 1/W_{RX}$ which will result in an accumulated phase error (i.e. frequency drift) at a receiver relative to a transmitter. For example, if $W_{TX}=3$, then $W_{RX}=0.333$ (or 0.3333 . . .) which cannot be within the receiver. If this accumulated phase error is not compensated for by a specialized circuit such as a phase locked loop (PLL), the sample frequency drift between the transmitter and the receiver will eventually cause a system failure. A generic communication system which employs an TX NCO and an RX NCO is shown to the receive rate converter. R can be any suitable integer depending on the system. As an example, if there is no decimation occurring prior to the receive rate converter, R is equal to one (1). In such a system, the phase word $W_{RX}$ for the RX NCO is computed from the phase word $W_{TX}$ for the transmit NCO. If the phase word $1/W_{TX}$ cannot be to avoid system failure.

Accordingly, there is a need for an improved reciprocal phase calculation such that it provides for arbitrary sample frequency conversion from CLK2 to CLK1 while preventing and eliminating accumulated phase error for the frequency conversion.

SUMMARY OF THE INVENTION

To overcome the limitations in the prior art described above, and to overcome other limitations that will become apparent upon reading and understanding the present specification, the present invention discloses a reciprocal phase calculation apparatus and a method of calculating reciprocal phase relations between a transmit rate converter and a receive rate converter of a digital communication system.

The present invention solves the above-described problems by providing a reciprocal phase calculation apparatus which provides for arbitrary sample frequency conversion from CLK2 to CLK1 and computes the receive sample phase from the transmit (TX) NCO value. The present invention eliminates the receive (RX) NCO and any accumulated errors that result from representing $W_{TX}=1/W_{RX}$ with finite precision.

In one embodiment of the present invention, a receive rate converter phase calculation apparatus comprises a transmit (TX) numerical controlled oscillator (NCO) converting a sample rate (or frequency) of transmit data from a first clock to a second clock and generating a modulo signal indicating a residual phase; and a receive phase calculator receiving the modulo signal and generating a receive sample phase such that a sample rate (or frequency) of receive data is converted from the second clock to the first clock by interpolating the receive sample phase between two adjacent signals of the receive data.

Other embodiments of the converter in accordance with the principles of the invention may include alternative or optional additional aspects. One such aspect of the present invention is that the TX NCO includes: an accumulator which accumulates a phase word (or a baud rate) at each tick of the second clock; and a modulo indicator which indicates the residual phase in a cycle of the second clock after a cycle of the first clock.

Another aspect of the present invention is that the receive phase calculator includes a first multiplier for multiplying the modulo signal and an inversion of the baud rate; an adder for adding a value which represents a number of decimated clock periods of the first clock and a minus value outputted from the first multiplier; and a second multiplier for multiplying an inversion of an integer which represents the number of decimated clock periods of the first clock and a value outputted from the adder.

The present invention also discloses a symmetric communication system that processes data using one clock domain (CLK1) and transmits and receives data in a conversion system utilizing a second clock domain (CLK2). The present invention relates to a receive rate converter phase calculation apparatus and method thereof in the symmetric communication system. In one embodiment of the present invention, the communication system comprises a timing circuit which generates phase conversion information from a transmitter to transfer data from the first clock domain to the second clock domain; and a receive phase calculation circuit that utilizes the phase conversion information from the transmitter to transfer data from the second clock domain to the first clock domain.

The present invention further discloses a method of utilizing a phase conversion information of a transmitter of a digital communication system during its conversion from a first clock domain to a second clock domain, to transfer data from the second clock domain to the first clock domain at a receiver of the digital communication system. The method comprises converting a sample rate (or frequency) of transmit data from the first clock to the second clock; generating a modulo signal indicating a residual phase in a cycle of the second clock after a cycle of the first clock; generating a receive sample phase; and interpolating the receive sample phase between two adjacent signals of receive data for conversion of a sample rate (or frequency) of the receive data from the second clock to the first clock at the receiver.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus to calculate reciprocal phase relations for a transmit rate converter and a receive rate converter in a digital communication system. The present invention discloses a timing circuit that generates phase conversion information from a transmitter to transfer data from a first clock domain to a second clock domain, and a receive phase calculation circuit at a receiver that utilizes the phase information from the transmitter to transfer data from the second clock domain to the first clock domain.

Figure 1:
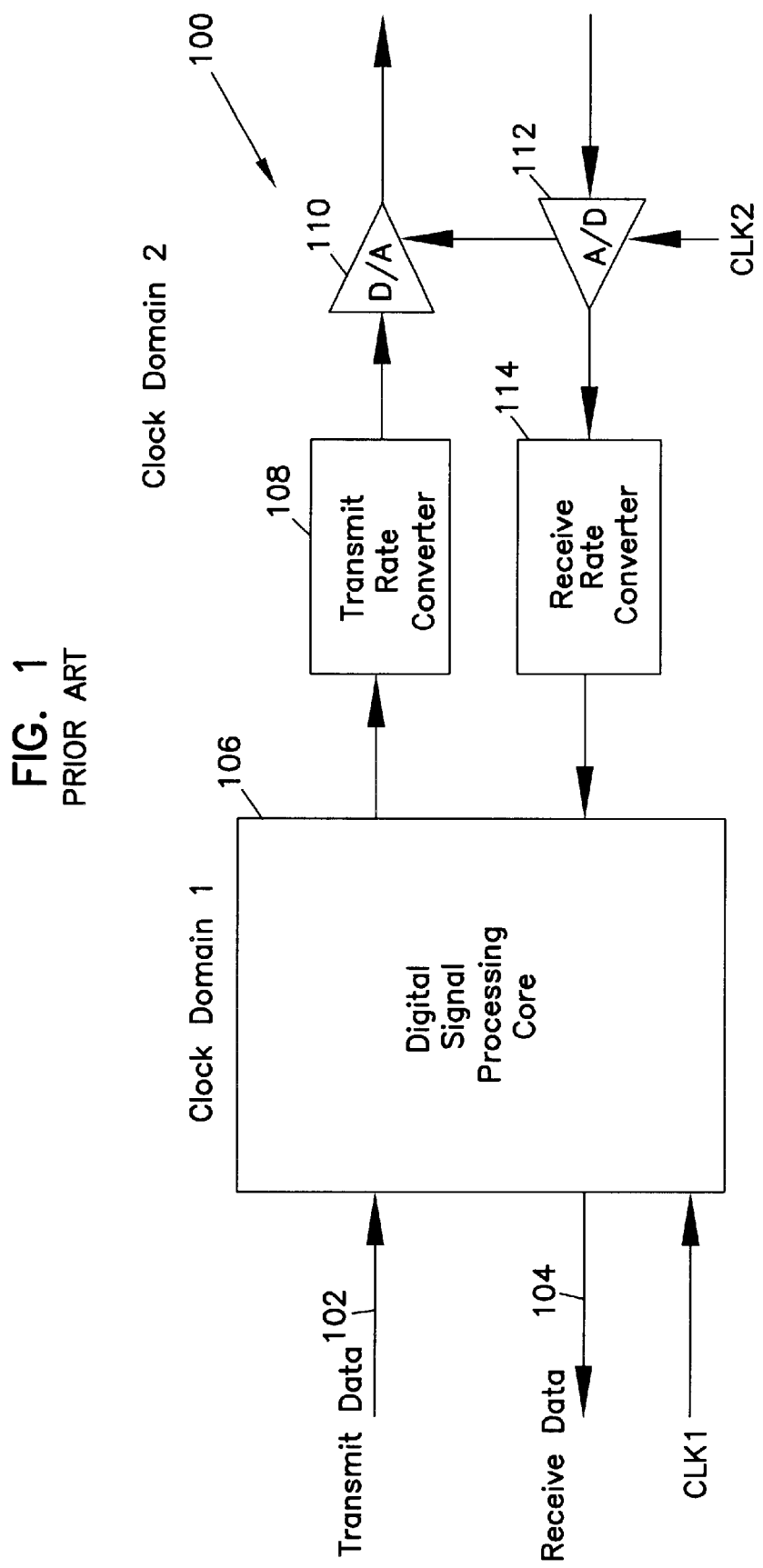
FIG. 1 illustrates a block diagram of a symmetric communication system employing two clock domains.

FIG. 1 illustrates a symmetric communication system 100 includes a transmit data path 102 and a receive data path 104. In the transmit data path 102, data is processed in a digital signal processing (DSP) core 106 which clocks in a first clock domain (CLK1 domain). The processed data is then transferred to a transmit rate converter 108 which converts the first clock domain to a second clock domain (CLK2 domain). The converted transmit data is then sent to a digital-to-analog (D/A) 110 for further transmission to a communication medium in the second clock domain. On the other hand, in the receive data path 104, data received from the communication medium is first sent to an analog-to-digital (A/D) 112 in the second clock domain. The converted data is then transferred to a receive rate converter 114 to convert the second clock domain to the first clock domain which is then processed by the DSP core 106 in the first clock domain.

Figure 2:
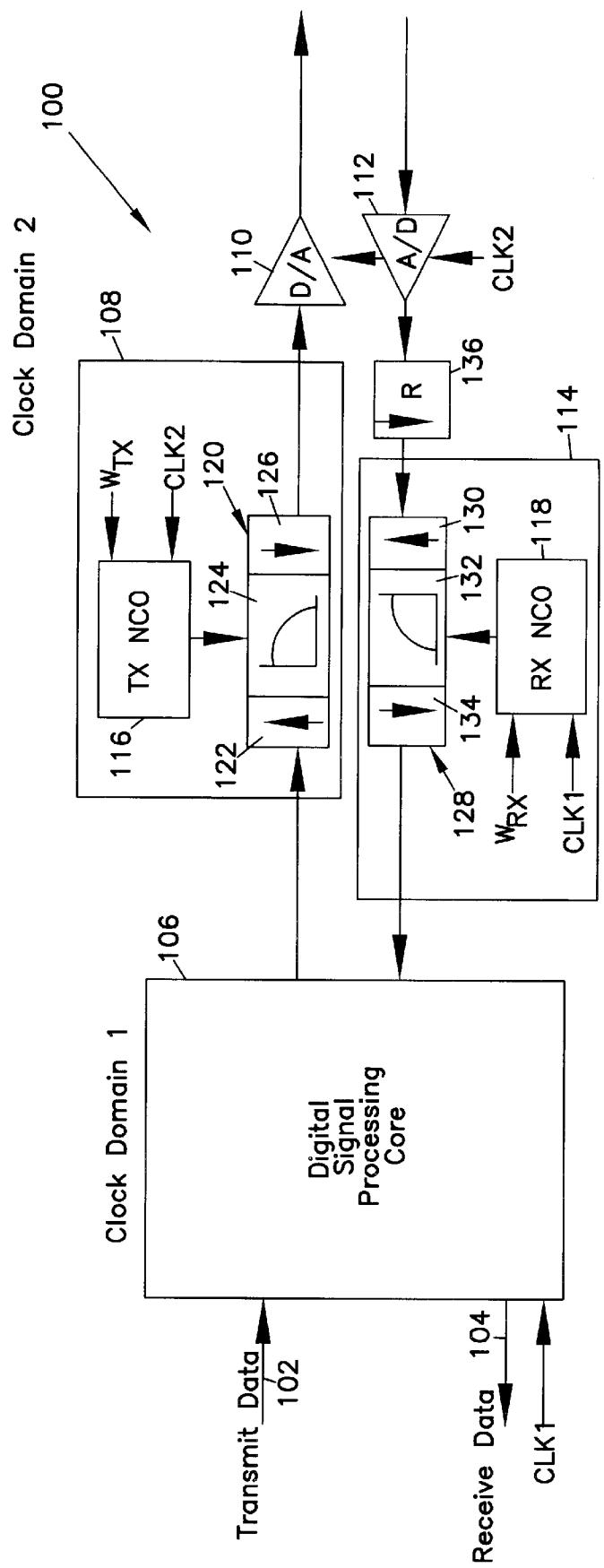
FIG. 2 illustrates a block diagram of a symmetric communication system with a transmitter numerical controlled oscillator (NCO) for a transmit rate converter and a receiver numerical controlled oscillator (NCO) for a receive rate converter.

FIG. 2 illustrates a frequency conversion system employing both a transmit (TX) numerical controlled oscillator (NCO) 116 and a receive (RX) numerical controlled oscillator (NCO) 118. The TX NCO 116 is a timing circuit to receive a phase word signal, $W_{TX}$, and the second clock CLK2 signals and generates phase conversion information for a transmit converter 120. The transmit converter 120 includes an upsampler 122, a converter filter 124, and a downsampler 126. The RX NCO 118 is a timing circuit to receive a phase word, $W_{RX}$ and the first clock CLK1 signals and generates phase conversion information for a receive converter 128. The receive rate converter 128 includes an upsampler 130, a converter filter 132, and a downsampler 134. An integer decimator 136 may be included prior to the receive rate converter 114.

In the sample rate (or frequency) conversion system in FIG. 2, the sample rate conversion in the transmit (TX) path can be accomplished through the use of an NCO with a phase word $W_{TX}=f_1/f_2$, wherein $f_1$ represents the frequency of CLK1 and $f_2$ represents the frequency of CLK2. Similarly, the sample rate conversion in the receive (RX) path can be accomplished through the use of an NCO with the reciprocal phase word $W_{RX}=f_2/f_1$. However, finite precision effects within the implementation can cause $W_{TX} \neq 1/W_{RX}$ which will result in accumulated phase error (i.e. frequency drift) at the receiver relative to the transmitter. For example, if $W_{TX}=3$, then $W_{RX}=0.33\overline{3}$ which cannot be exactly represented and any error in $W_{RX}$ will be accumulated within the receiver. If this accumulated phase error is not compensated for by a specialized circuit such as a phase lock loop (PLL), the sample frequency drift between the transmitter and the receiver will eventually cause a system failure.

Figure 3:
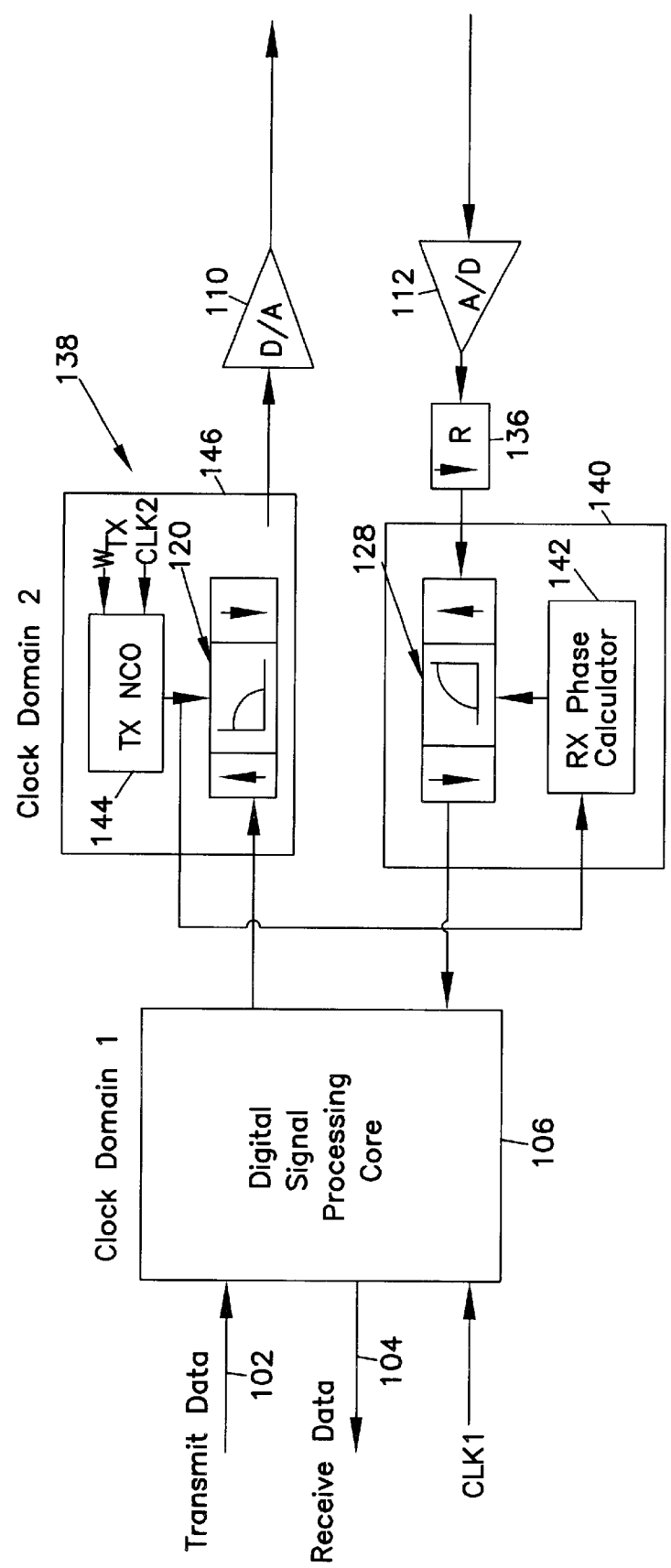
FIG. 3 illustrates a block diagram of a symmetric communication system with a transmitter numerical controlled oscillator (NCO) for a transmit rate converter and a receive rate converter according to the present invention.

The above problem can be resolved by using transmit phase conversion information from a TX NCO to calculate receive phase conversion information for a receive converter. FIG. 3 illustrates a receive rate converter 140 which includes a receive (RX) phase calculator 142. The RX phase calculator 142 generates receive phase conversion information by using transmit phase conversion information from a TX NCO 144 of a transmit rate converter 146. The receive phase conversion information from the RX phase calculator 142 is then sent to the receive converter 128.

Figure 4:
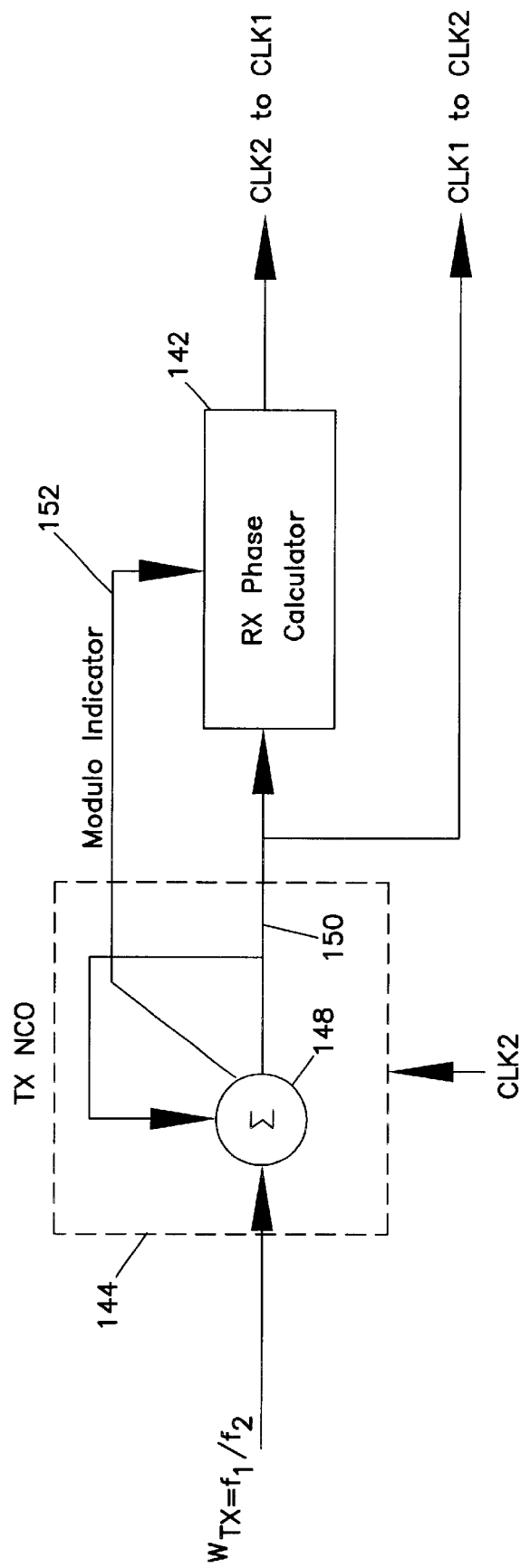
FIG. 4 illustrates a more detailed block diagram of the receive rate converter according to the present invention.

FIG. 4 illustrates the TX NCO 144 of the present invention in details. The TX NCO 144 is a timing circuit which includes an accumulator 148 which accumulates a baud rate (or a phase word) $W_{TX}=f_1/f_2$, wherein $f_1$ represents the frequency of CLK1 and $f_2$ represents the frequency of CLK2 at each tick of the second clock CLK2 The TX NCO 144 operates modulo one, and the output of the accumulator 148 represents the phase of the first clock CLK1 at each tick of the second clock CLK2 Since $W_{TX}$ represents the fraction of a cycle of the first clock CLK1 accumulated every cycle of CLK2 the period between successive modulo operations of the TX NCO 144 equals one period of the first clock CLK1 plus a fraction of a period of the second clock CLK2 e.g. in FIG. 5, between the point b and point c. The value outputted from the TX NCO 144 at line 150 represents the correct CLK2 transmit phase exactly the same as the TX NCO in a dual NCO system as shown in FIG. 2. A modulo indicator of the TX NCO 144 sends a phase fraction signal to the RX phase calculator 142 via line 152. The RX phase calculator 142 then uses the phase fraction signal to compute the correct CLK1 receive phase. The computation of such correct CLK1 receive phase is discussed in more detail in FIGS. 5 and 6. One advantage of the present invention is that the CLK1 receive phase is calculated without using a second NCO, thereby eliminating the receive (RX) NCO shown in FIG. 2 and any dependence on the relation $W_{TX}=/W_{RX}$.

Figure 5:
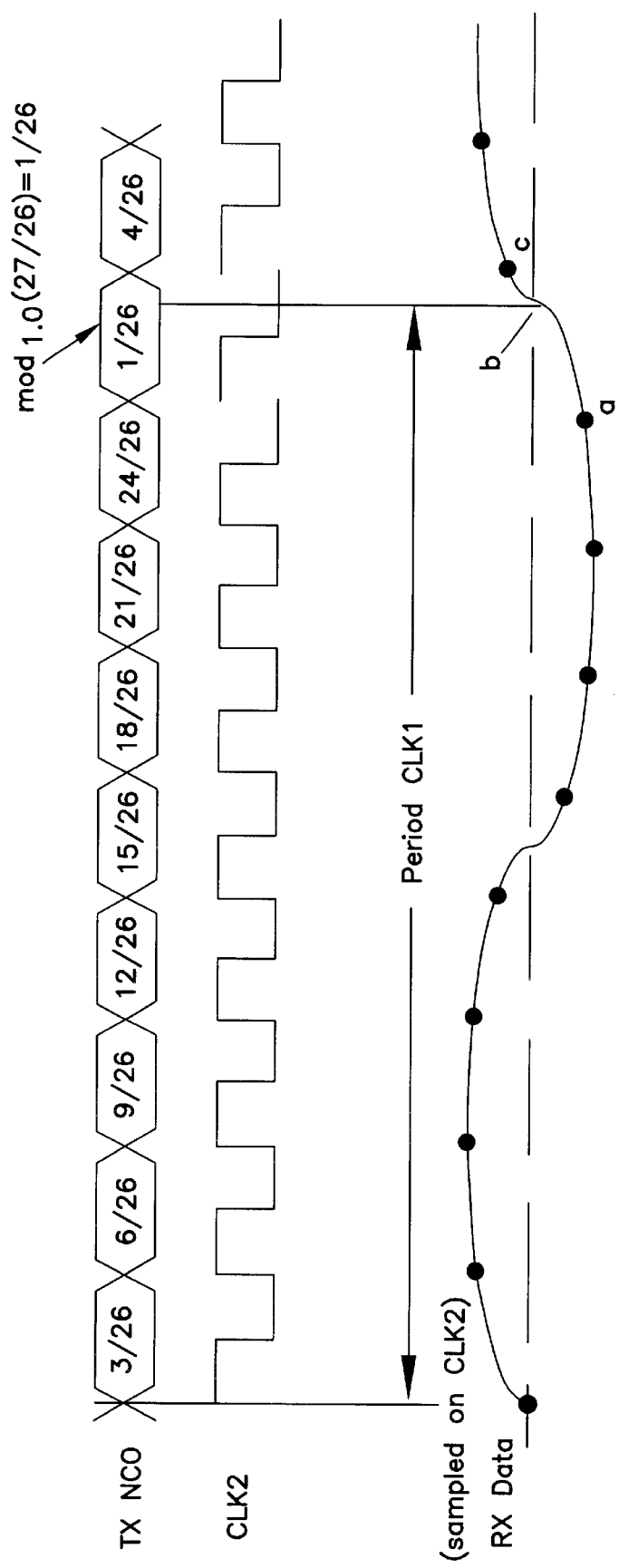
FIG. 5 illustrates a receive rate converter phase calculation method with respect to a clock diagram according to the present invention.

FIG. 5 shows an exemplary receive phase calculation in accordance with the principles of the present invention. An arbitrary frequency conversion $f_1/f_2=3/26$ is assumed. It is also assumed that no decimation occurs prior to the receive rate converter (i.e. the decimator R=1). The TX NCO 144 accumulates the value $W_{TX}=3/26$ modulo one. As shown in FIG. 5, the TX NCO 144 modulos at point "a", and the receive rate converter 140 computes the correct receive phase based on CLK1 (i.e., point "b"). More specifically, since $f_2/f_1=26/3=8.666\overline{6}$, it is apparent that the correct phase lies exactly ⅔ of the way from the current CLK2 sample at point "a" and ⅓ of the way from the next CLK2 sample at point "c". The calculation for the receive sample phase is as follows:

$$\text{Receive sample phase} = 1 - \text{mod}_1\{TX\ NCO\}/W_{rx}$$
$$= 1 - \text{mod}_1\{TX\ NCO\} * f_2/f_1$$
$$= (1/26) * (26/3) = 2/3$$

The correct CLK1 sample phase at the receive converter output is obtained by interpolating ⅔ of the distance between two adjacent CLK2 input samples.

It is noted from FIG. 5 that, to facilitate the explanation of this example, the receive (RX) data phase is initially aligned with the second clock CLK2 It will be appreciated that such an assumption is unnecessary because any constant phase offset does not change the conversion frequency $f_1/f_2$ and can be accommodated by the system's baud phase recovery scheme.

Figure 6:
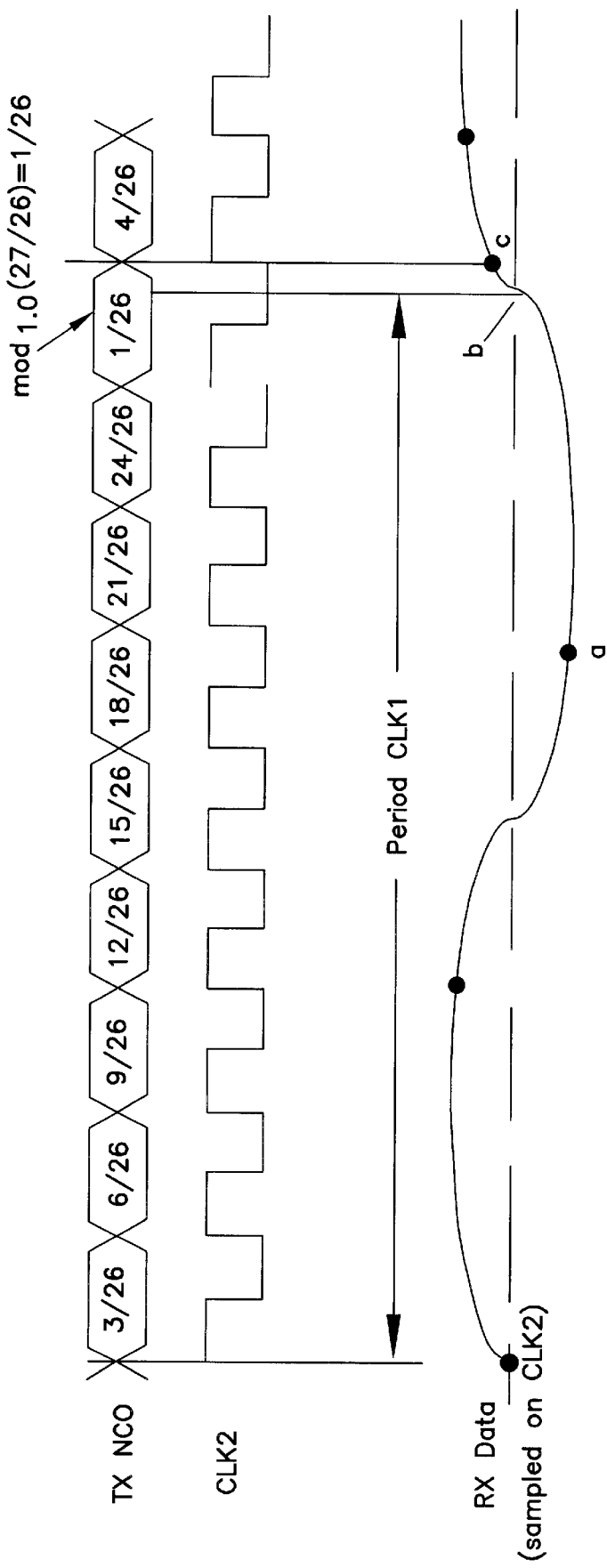
FIG. 6 illustrates another receive rate converter phase calculation method with respect to a clock diagram according to the present invention.

FIG. 6 shows a second example of receive phase calculation in accordance with the principles of the present invention. Same as the first example in FIG. 5, the frequency conversion is arbitrary, e.g. $f_1/f_2=3/26$. The difference is that the system now includes a decimator 136 with R=3. Again, the TX NCO 144 accumulates $W_{TX}=3/26$ modulo one. The correct output sample based on CLK1 for the RX data is point "b" which lies between the converter input samples at point "a" and point "c". Since $(f_2/R)/f_1=26/9=2.8888$, it is apparent that the correct phase lies exactly $0.888\overline{8}$ times the distance between the previous sample at point "a" and the current sample at point "c". The calculation for the receive sample phase is as follows:

$$\text{Receive sample phase} = (1/R)(N - \text{mod}_1\{TX\ NCO\} * f_2/f_1)$$
$$= (1/3)(3 - \text{mod}_1\{TX\ NCO\} * f_2/f_1)$$
$$= 8/9 = 0.888\overline{8}$$

where R is the decimation of the decimator 136 preceding the receive rate converter 140 (i.e. converter input rate $=f_2/R$), and N represents the number of decimated clock periods that have passed since the last modulo operation of the TX NCO 144. It will be appreciated that the decimation R can be other suitable integers, such as 2, 4, 5, . . . and that N can be other suitable integers, such as 2, 4, 5, . . . , depending on the communmcation system without departing from the principles of the present invention.

The correct CLK1 sample phase at the receive converter output is obtained by interpolating 8/9 of the distance between the previous and current CLK2 input samples.

It is noted that although the present invention may still require the computation of $1/W_{TX}$, any finite-precision error that is introduced is not accumulated and, as such, will not create sample frequency drift at the receiver. Furthermore, as already stated, a RX NCO can be completely eliminated from the system of the present invention.

It is also noted from FIG. 6 that, to facilitate the explanation of the example, the receive (RX) data phase is initially aligned with the second clock CLK2 It will be appreciated that such an assumption is unnecessary because any constant phase offset does not change the conversion frequency $f_1/f_2$ and can be accommodated by the system's baud phase recovery scheme.

FIGS. 3–6 also shows a method of utilizing a phase conversion information of a transmitter during its conversion from a first clock domain to a second clock domain, to transfer data from the second clock domain to the first clock domain at a receiver in accordance with the present invention. A sample rate (or frequency) of transmit data is converted from the first clock CLK1 to the second clock CLK2 This converted phase information is sent to the transmit converter 120. Meanwhile, a modulo signal indicating a residual phase in a cycle of the second clock CLK2 after a cycle of the first clock CLK1 is generated. A receive sample phase is then calculated based on the residual phase, which is interpolated between two adjacent signals of receive data to obtain the CLK1 sample phase at the receive converter output.

Further, it will be appreciated that a transmit rate converter phase calculation apparatus and method can be accomplished in a similar way without departing from the present invention. In such a case, a timing circuit that generates phase conversion information from a receiver to transfer data from a second clock domain to a first clock domain, and the receive phase calculation apparatus and method utilizes the phase information from the receiver to transfer data from the first clock domain to the second clock domain.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claim is:

1. A receive phase calculation apparatus for transferring data in a communication system between a first clock domain and a second clock domain, the system having a transmitter, a receiver, a first clock and a second clock, the apparatus comprising:
    a timing circuit for generating phase conversion information for the transmitter to transfer a transmit phase of the second clock from the first clock domain to the second clock domain; and
    a receive phase calculator utilizing the phase conversion information from the transmitter to transfer a receive phase of the first clock from the second clock domain to the first clock domain.

2. The apparatus of claim 1, wherein the timing circuit is a transmit (TX) numerical controlled oscillator (NCO).

3. The apparatus of claim 2, wherein the TX NCO includes:
    an accumulator which accumulates a baud rate of the communication system at each tick of the second clock; and
    a modulo indicator which indicates a residual phase in a cycle of the second clock after a cycle of the first clock.

4. The apparatus of claim 3, wherein the receive phase calculator includes:
    a first multiplier for multiplying the modulo signal and an inversion of the baud rate;
    an adder for adding a value which represents a number of decimated clock periods of the first clock and a minus value outputted from the first multiplier; and
    a second multiplier for multiplying an inversion of an integer which represents the number of decimated clock periods of the first clock and a value outputted from the adder.

5. A sample rate conversion apparatus in a communication system, comprising:
    a transmit (TX) rate converter, the TX rate converter converting a sample rate of transmit data from a first clock to a second clock and generating a modulo signal indicating a residual phase; and
    a receive (RX) rate converter, the RX rate converter including a phase calculator which receives the modulo signal and generates a receive sample phase such that a sample rate of receive data is converted from the second clock to the first clock by interpolating the receive sample phase between two adjacent signals of the receive data.

6. The apparatus of claim 5, wherein the TX converter includes a timing circuit which is a numerical controlled oscillator (NCO), the NCO includes:
    an accumulator which accumulates a baud rate of the communication system at each tick of the second clock; and
    a modulo indicator which indicates the residual phase in a cycle of the second clock after a cycle of the first clock.

7. The apparatus of claim 6, wherein the receive phase calculator includes:
    a first multiplier for multiplying the modulo signal and an inversion of the baud rate;
    an adder for adding a value which represents a number of decimated clock periods of the first clock and a minus value outputted from the first multiplier; and
    a second multiplier for multiplying an inversion of an integer which represents the number of decimated clock periods of the first clock and a value outputted from the adder.

8. A communication system, comprising:
    a digital signal processing core for processing transmit data before transmission of the data and processing receive data after reception of the data;
    a transmit (TX) rate converter coupled to the digital signal processing core, the TX rate converter converting a sample rate of transmit data from a first clock to a second clock and generating a modulo signal indicating a residual phase; and
    a receive (RX) rate converter coupled to the digital signal processing core, the RX rate converter including a phase calculator which receives the modulo signal and generates a receive sample phase such that a sample rate of receive data is converted from the second clock to the first clock by interpolating the receive sample phase between two adjacent signals of the receive data.

9. The communication system of claim 8, wherein the TX converter includes a timing circuit which is a numerical controlled oscillator (NCO), the NCO includes:
    an accumulator which accumulates a baud rate of the communication system at each tick of the second clock; and
    a modulo indicator which indicates the residual phase in a cycle of the second clock after a cycle of the first clock.

10. The communication system of claim 9, wherein the receive phase calculator includes:
    a first multiplier for multiplying the modulo signal and an inversion of the baud rate;
    an adder for adding a value which represents a number of decimated clock periods of the first clock and a minus value outputted from the first multiplier; and
    a second multiplier for multiplying an inversion of an integer which represents the number of decimated clock periods of the first clock and a value outputted from the adder.

11. A method of reciprocal phase calculation in a symmetric communication system, comprising:
    providing a frequency of a first clock and a frequency of a second clock, a baud rate being a value of the frequency of the first clock divided by the frequency of the second clock;
    converting a sample rate of first data from the first clock to the second clock;
    generating a modulo signal indicating a residual phase in a cycle of the second clock after a cycle of the first clock;
    generating a receive sample phase based on the modulo signal; and
    interpolating the receive sample phase between two adjacent signals of second data for converting a sample rate of the second data from the second clock to the first clock.

12. The method of claim 11, wherein the converting of the sample rate of first data from the first clock to the second clock is accomplished in transmitting the data.

13. The method of claim 12, wherein the converting of the sample rate of the second data from the second clock to the first clock is accomplished in receiving the data.

14. The method of claim 11, wherein the converting of the sample rate of first data from the first clock to the second clock is accomplished in receiving the data.

15. The method of claim 14, wherein the converting of the sample rate of the second data from the second clock to the first clock is accomplished in transmitting the data.

16. A receive phase calculation apparatus for transferring data in a communication system between a first clock domain and a second clock domain, the system having a transmitter and a receiver, comprising:

a transmit (TX) numerical controlled oscillator (NCO) for generating phase conversion information from the transmitter to transfer data from the first clock domain to the second clock domain; and a receive phase calculator utilizing the phase conversion information from the transmitter to transfer data from the second clock domain to the first clock domain wherein the TX NCO comprises:

an accumulator which accumulates a baud rate of the communication system at each tick of the second clock; and a modulo indicator which indicates a residual phase in a cycle of the second clock after a cycle of the first clock.

17. The apparatus of claim 10, wherein the receive phase calculator includes:

a first multiplier for multiplying the modulo signal and an inversion of the baud rate;

an adder for adding a value which represents a number of decimated clock periods of the first clock and a minus value outputted from the first multiplier; and a second multiplier for multiplying an inversion of an integer which represents the number of decimated clock periods of the first clock and a value outputted from the adder.

* * * * *

UNITED STATES PATENT AND TRADEMARK OFFICE
CERTIFICATE OF CORRECTION

PATENT NO. : 6,535,565 B1
DATED : March 18, 2003
INVENTOR(S) : Girardeau, Jr. et al.

It is certified that error appears in the above-identified patent and that said Letters Patent is hereby corrected as shown below:

Column 2,
Line 6, "$W_{RX}=0.333$ (or 0.3333 . . .) which cannot be within the" should read
-- $W_{RX} = 0.333$ (or 0.3333...) which cannot be exactly represented in the implementation, and any error in $W_{RX}$ will be accumulated within the --
Line 12, "and an RX NCO is shown to the" should read -- and an RX NCO is shown in FIG. 2 to the --
Lines 12-13, "R can be any suitable integer depending on the system." should read -- For generality, an integer decimation represented by R is also included prior to the receive rate converter. R can be any suitable integer depending on the system. --

Column 5,
Lines 14, 17 and 21, "second clock CLK2" should read -- second clock CLK2. --
Line 34, "$W_{TX}=/W_{RX}$." should read -- $W_{TX}=1/W_{RX}$. --

Column 6,
Line 7, "$(f_2/R)/f_1=26/9=2.8888$," should read -- $\overline{(f_2 / R) / f_1} = 26 / 9 = 2.8888$, --
Line 50, "CLK2 This" should read -- CLK2. This --

Signed and Sealed this

Sixteenth Day of September, 2003

JAMES E. ROGAN
*Director of the United States Patent and Trademark Office*